United States Patent
Zhao et al.

(10) Patent No.: US 7,275,033 B1
(45) Date of Patent: Sep. 25, 2007

(54) METHOD AND SYSTEM FOR USING RULE-BASED KNOWLEDGE TO BUILD A CLASS-BASED DOMAIN SPECIFIC STATISTICAL LANGUAGE MODEL

(75) Inventors: Yibao Zhao, HeiLongJiang (CN); Yonghong Yan, Beijing (CN); Zhiwei Lin, Singapore (SG)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 10/130,860

(22) PCT Filed: Sep. 30, 2000

(86) PCT No.: PCT/CN00/00297

§ 371 (c)(1), (2), (4) Date: Feb. 14, 2003

(87) PCT Pub. No.: WO02/29783

PCT Pub. Date: Apr. 11, 2002

(51) Int. Cl.
*G10L 15/18* (2006.01)
*G06F 17/27* (2006.01)

(52) U.S. Cl. ................ 704/255; 704/257; 704/9
(58) Field of Classification Search ........... None
See application file for complete search history.

(56) References Cited

U.S. PATENT DOCUMENTS

| | | |
|---|---|---|
| 5,752,052 A | 5/1998 | Richardson et al. |
| 5,839,106 A * | 11/1998 | Bellegarda ................ 704/257 |
| 6,292,779 B1 * | 9/2001 | Wilson et al. ............. 704/257 |
| 6,405,162 B1 * | 6/2002 | Segond et al. ................ 704/9 |
| 6,477,524 B1 * | 11/2002 | Taskiran et al. .............. 707/2 |
| 7,031,908 B1 * | 4/2006 | Huang et al. ................ 704/9 |
| 2001/0051868 A1 * | 12/2001 | Witschel ..................... 704/9 |

FOREIGN PATENT DOCUMENTS

| | | |
|---|---|---|
| EP | 0938076 A | 8/1999 |
| WO | WO96/37881 A | 11/1996 |

OTHER PUBLICATIONS

Kellner, A. "Initial language models for spoken dialogue systems", Acoustics, Speech and Signal Processing 1998, vol. 1 pp. 185-188.*
Zue, Victor, et al, "*JUPITER: A Telephone-Based Conversational Interface for Weather Information*", IEEE Trans. on Speech and Audio Processing, vol. 8, No. 1, pp. 100-112, Jan. 2000.
Search Report for PCT/CN00/00297; mailed Mar. 29, 2001; 1 page.

* cited by examiner

*Primary Examiner*—David Hudspeth
*Assistant Examiner*—Matthew J. Sked
(74) *Attorney, Agent, or Firm*—Guojun Zhou (57) ABSTRACT

A method and system for providing a class-based statistical language model representation from rule-based knowledge is disclosed. The class-based language model is generated from a statistical representation of a class-based rule net. A class-based rule net is generated using the domain-related rules with words replaced with their corresponding class-tags that are manually defined. The class-based statistical representation from the class-based rule net is combined with a class-based statistical representation from a statistical language model to generate a language model. The language model is enhanced by smoothing/adapting with general-purpose and/or domain-related corpus for use as the final language model. A two-pass search algorithm is applied for speech decoding.

21 Claims, 9 Drawing Sheets

METHOD AND SYSTEM FOR USING RULE-BASED KNOWLEDGE TO BUILD A CLASS-BASED DOMAIN SPECIFIC STATISTICAL LANGUAGE MODEL

FIELD OF THE INVENTION

The present invention relates generally to speech processing and to speech recognition systems. More particularly, the present invention relates to a method and system for using rule-based knowledge to build a class-based domain specific statistical language model.

BACKGROUND OF THE INVENTION

The ability of computer systems to recognize speech has vastly improved with the progress of technology. These improvements have given rise to new areas of speech recognition technology which are being utilized in various fields today. Language models play a very important role in speech recognition systems. There are two common types of language models that are used today. One is a rule-based statistical language model (RSLM) and the other is a statistical language model (SLM).

SLM is statistics-based and uses a large amount of text to determine its model parameters automatically. The parameters govern the natural language processing or speech recognition in an SLM. An SLM can be trained more easily and decode at a faster speed, however, it has many disadvantages. A disadvantage of using an SLM is that it lacks in quality since it depends on a corpus to train the SLM. A corpus is a data set collected from real-world applications. For example, text from a newspaper is considered as a text corpus. Therefore, the SLM requires a huge corpus with a very large coverage to perform at sufficient levels. In practice, the large corpus and coverage requirements impose great limitations, especially in narrow-domain dialogue system. Thus, building an SLM becomes very difficult and even if build results in poor performance.

A rule-based statistical language model (RSLM) can be used to overcome these drawbacks. The RSLM obtains the statistical information directly from the rule net, and builds a statistical language model with the statistical information. A rule net is a net of grammar rules derived from general linguistics or domain knowledge such as syntactic or semantic knowledge. These rules are created for governing the use of words in the rule net. The disadvantage of RLM is that it works well only in closed environment. Another disadvantage of using a rule-based system is that the created rules are often not complete enough to cover all circumstances when the system works in an open environment. Due to lack of complete knowledge, the rule-based system lacks the ability to perform accurately and with precision. Another disadvantage of a rule-based system is when a large amount of rules are used decoding speed slows down drastically and creates a fatal situation during real-time system implementation.

BRIEF DESCRIPTION OF THE DRAWINGS

The features and advantages of the present invention are illustrated by way of example and not intended to be limited by the figures of the accompanying drawings in which like references indicate similar elements and in which.

DETAILED DESCRIPTION

A method and system for using rule-based knowledge to build a class-based domain specific statistical language model is described. Words of domain-related rules are replaced with their corresponding class-tags to generate class-based domain-related rules. A class-based rule net is generated using the class-based domain-related rules. A class-based statistical representation is obtained using the class-based rule net from an SLM. The class-based statistical representation from the SLM is combined with a class-based statistical representation from an RLM. A two-pass search decoding method with class-based RSLM is applied.

Replacing words with class-tags prevents a language model from becoming huge in size and drastically slowing down the system performance and makes speech processing task implementation easy. In addition, manually defining classes allows careful class-selection ensuring that words in a class have the same function and semantic meaning maintaining a consistency. Class consistency helps in easy speech processing and uses minimal memory space. Thus, speech-processing systems with class-based language models can operate at faster speeds while maintaining accuracy in speech recognition or natural language processing.

By combining both class-based statistical representations, the language model possesses both real-world and hand-crafted knowledge. This large knowledge base allows a language model to be used effectively in recognizing a variety of domain specific speeches or natural language processing. In addition, by combining both class-based statistical representations, the language model represents adequately both models. Thus, the system can operate at faster speeds while maintaining accuracy in speech recognition or natural language processing.

Conventional class-based decode search method calculates the sentence probability through multiplying the probability of sentence clause and the probability of words of each class in the sentence clause together. It's drawback is when the item number of each class changes (for example, the number of the names in class name changes, this is often happened in real-world application), the language model should be retrained. Two-pass search method in this invention separates the calculation into two steps, which can overcome the drawbacks.

Figure 1:
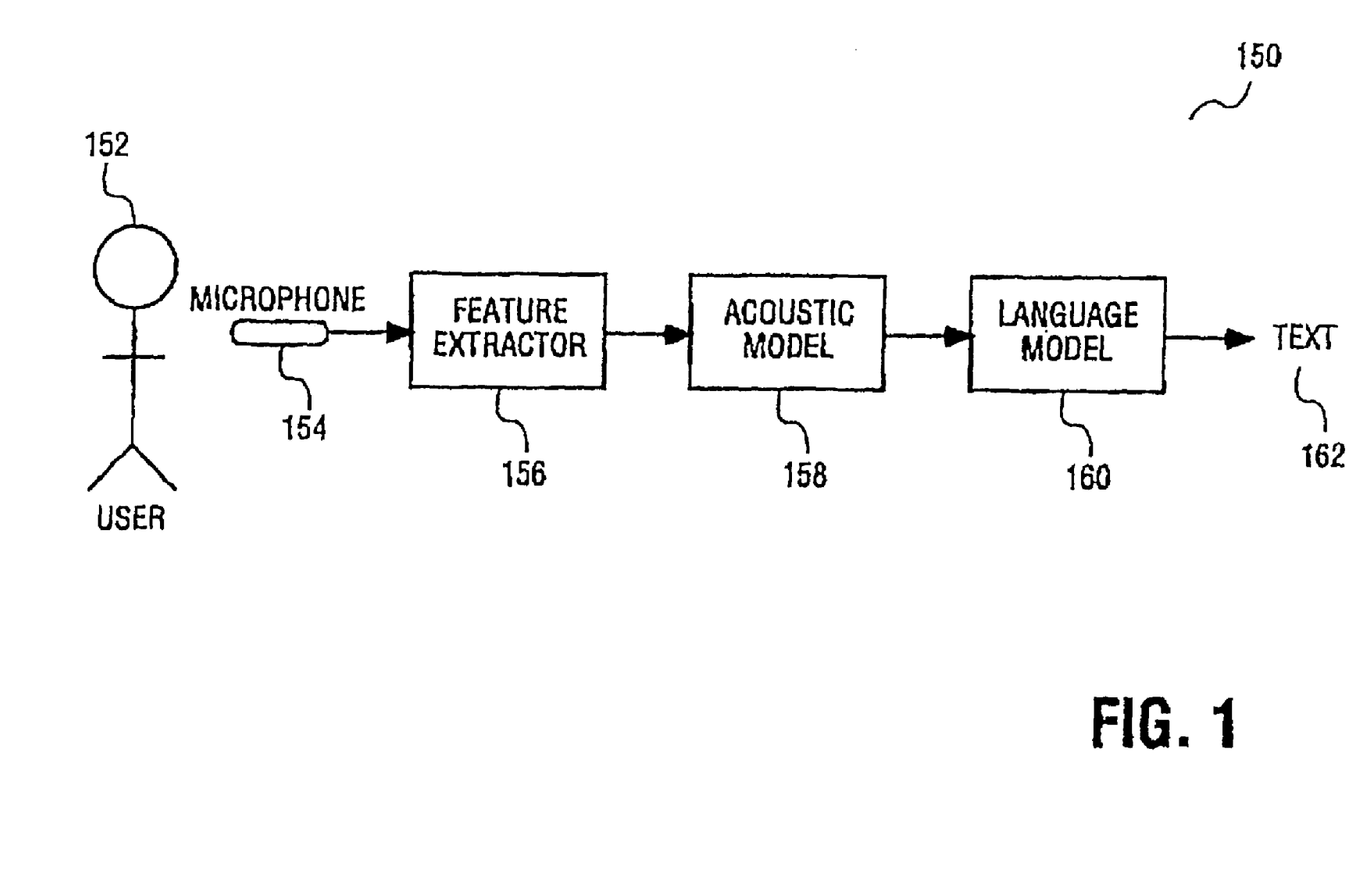
FIG. 1 is a block diagram of an exemplary speech processing system according to one embodiment.

FIG. 1 is a block diagram of an exemplary speech processing system 150 for practicing the invention. The speech processing system 150 is able to process speech into a text format. The speech processing system 150 includes a microphone 154, a feature extractor 156 coupled to the microphone 154, an acoustic model 158 coupled to the feature extractor 156, and a language model 160 coupled to the acoustic model 158. Items of the speech processing system 150 could be presented as circuitry or software.

A feature extractor 156 coupled to a microphone 154 receives a speech signal from the microphone 154. The speech signal corresponds to speech by a user represented by reference number 152 spoken into the microphone 154. The feature extractor 156 receives the speech signal and converts the spectral measurements of speech to a set of features. The set of features describe the acoustic properties of various phonetic sounds for example nasal or friction sounds.

An acoustic model 158 coupled to the feature extractor 156 receives the set of features. The acoustic model 158 compares the set of features to acoustic-phonetic sounds stored in the model. The acoustic model 158 decodes the set of features according to stored acoustic-phonetic sounds and sends the decoded information to the language model 160.

A language model 160 coupled to the acoustic model 158 receives information from the acoustic model 158. The information contains decoded information from the acoustic model as well as information that has been sent by the feature extractor 156, which has not been decoded by the acoustic model 158. The language model 160 evaluates both decoded and non-decoded information and converts to text. The language model building method is further described in FIG. 2.

Figure 2:
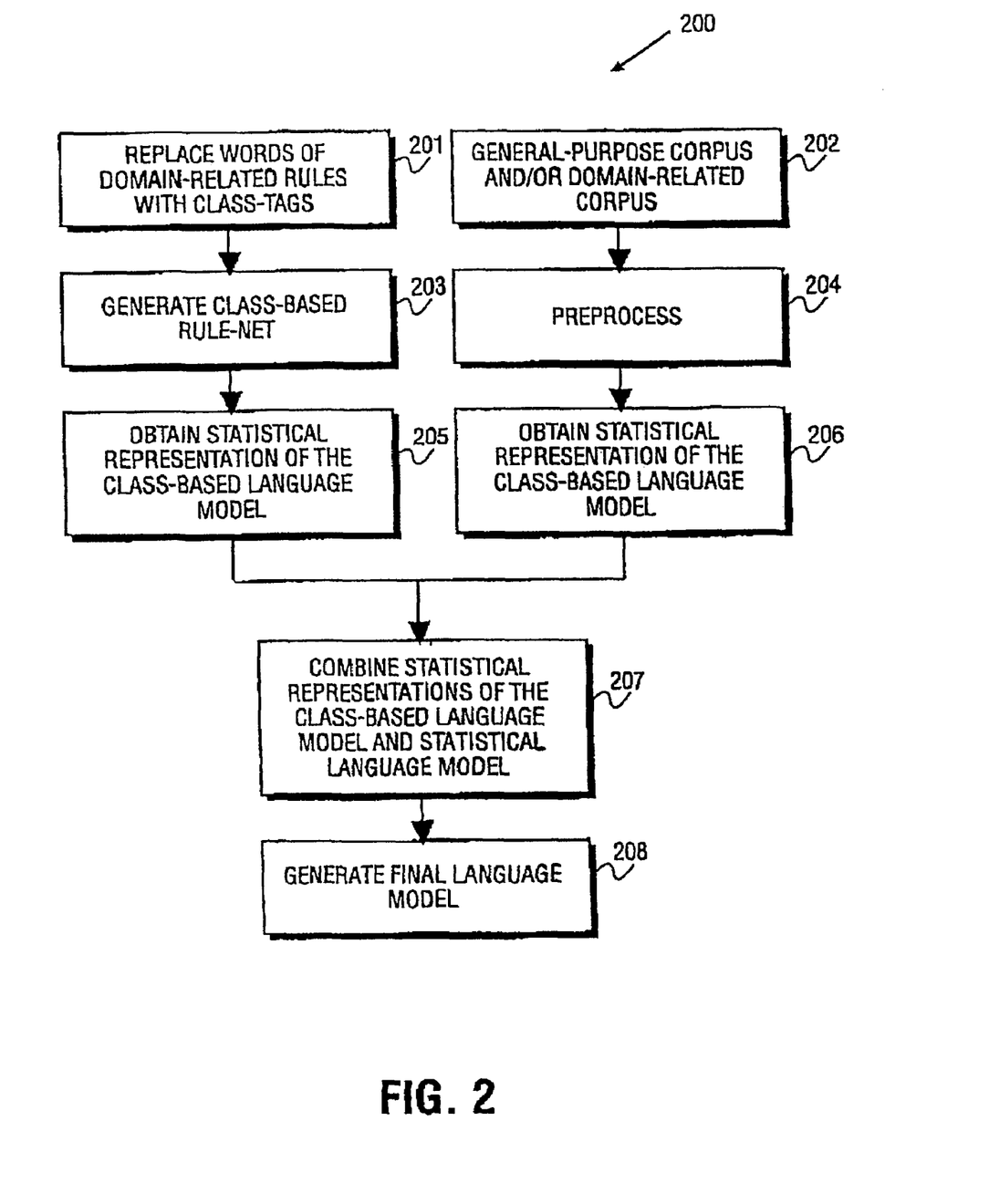
FIG. 2 is a flow chart of an operation to generate a final class-based language model using statistical representations according to one embodiment.

FIG. 2 is a flow chart of an operation 200 to generate a final language model using a statistical representation according to one embodiment. Operation 200 can be implemented by digital processing system 800. Operation 200 also allows an algorithm to generate a class-based rule net using domain-related class-based rules and use the rule net to obtain a statistical representation. The statistical representation is used for generating a final language model for a speech processing system.

Figure 3:
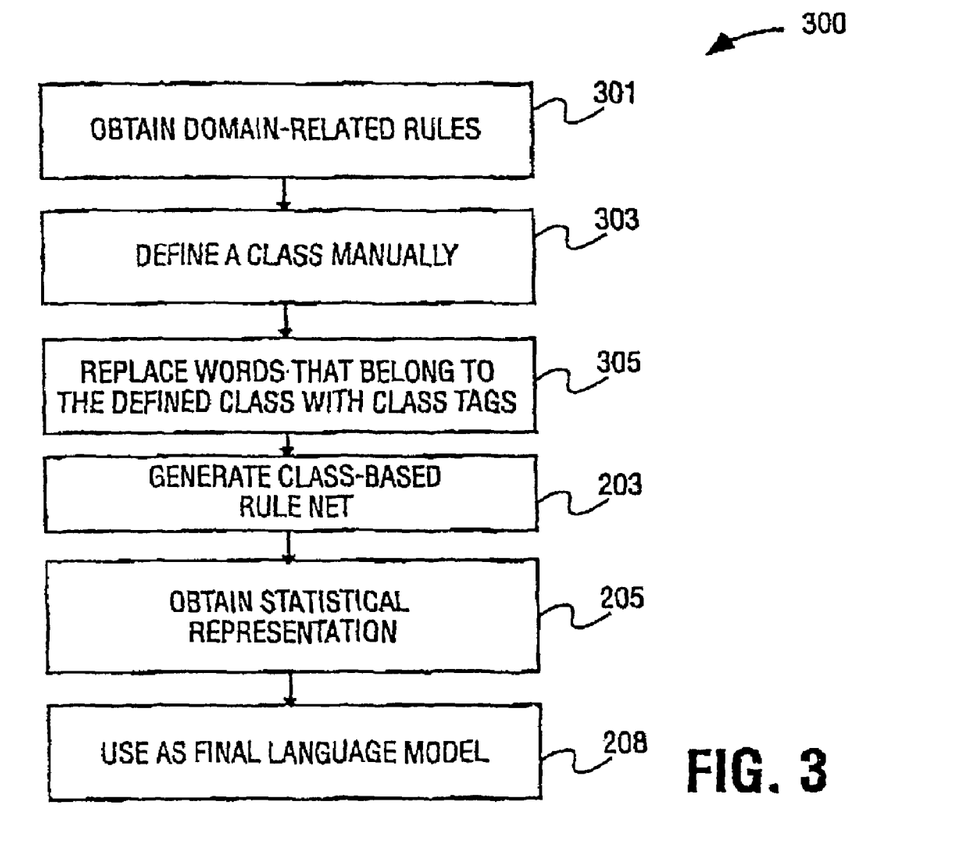
FIG. 3 is a flow chart of an operation to generate a final class-based language model using class-based rule net according to one embodiment.
Figure 6:
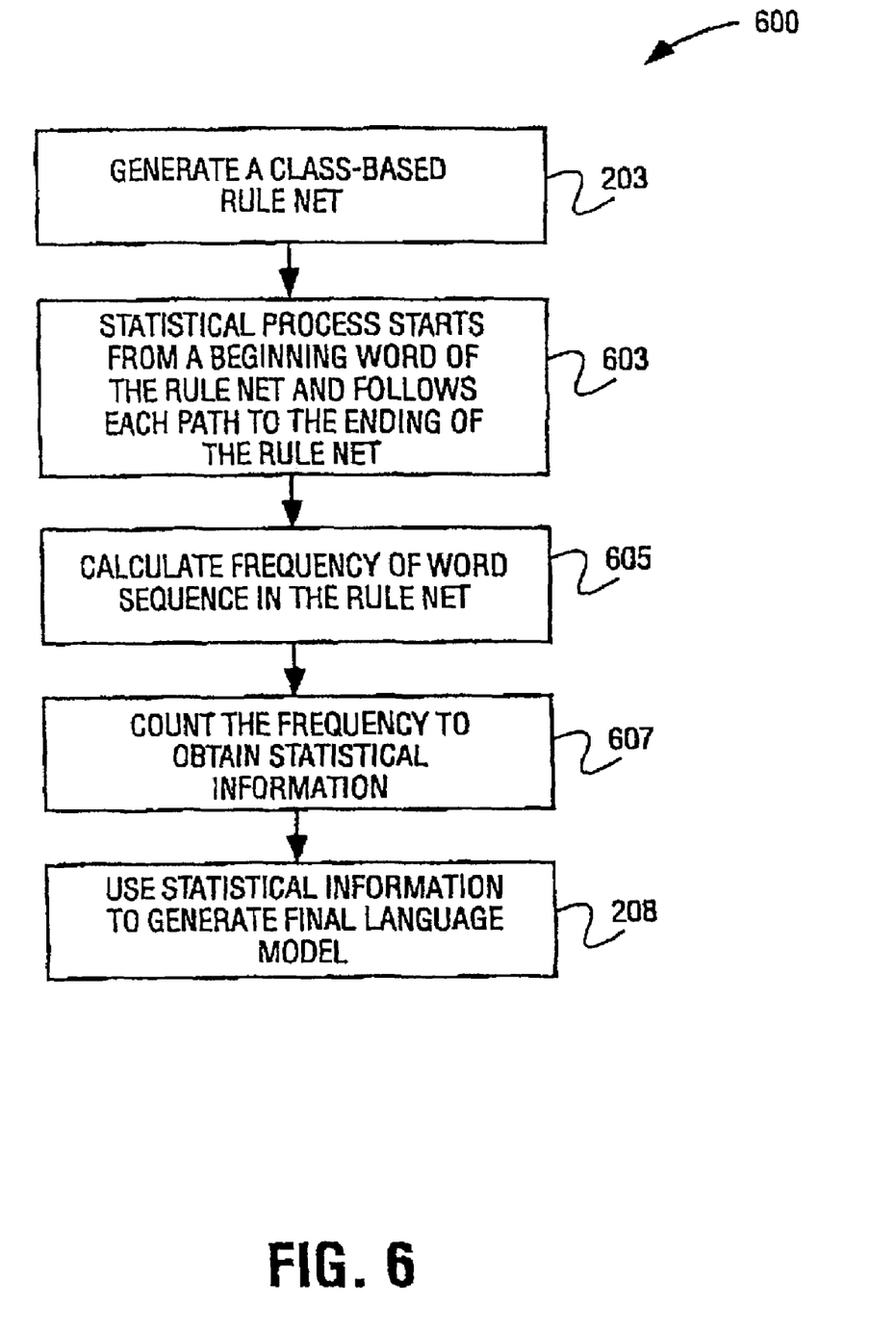
FIG. 6 is a flow chart of an operation to generate a final class-based language model using a statistical process to obtain a statistical representation according to one embodiment.

Referring to FIG. 2, at operation block 201, words of domain related rules are replaced with their corresponding class-tags, and class-based domain-related rules are obtained. FIGS. 3 and 6 further describes detailed aspects of obtaining class-based domain related rules and their use for various embodiments.

At operation block 203, a class-based rule net is generated. The rule net is composed of rules. Rules are created for governing the use of words in the rule net. FIGS. 3 and 6 further describe detailed aspects of collecting rules to generate rule nets and rule creations for various embodiments.

At operation block 205, a statistical representation of the class-based rule net is obtained. Class-based rule net is a set of hand-crafted grammar rules derived from general linguistics or domain knowledge such as syntactic or semantic knowledge. The words of the grammar rules are replaced with their corresponding class-tags to generate a class-based rule net. These rules are generated for governing the use of words in the rule net.

A statistical representation of the class-based rule net is obtained from the generated class-based rule net. The statistical representation is obtained through traversing the class-based rule net or from the sentences generated from the rule net. A statistical formula is applied to obtain the statistical representation while traversing the rule net. FIG. 6 further describes detail aspects of obtaining a statistical representation of the class-based rule net.

At operation block 202, general-purpose or domain-related corpus are obtained. The statistical language model-obtained from an RLM is often not robust. A general-purpose or domain-related corpus can be used to smooth the RLM-based SLM.

Figure 4:
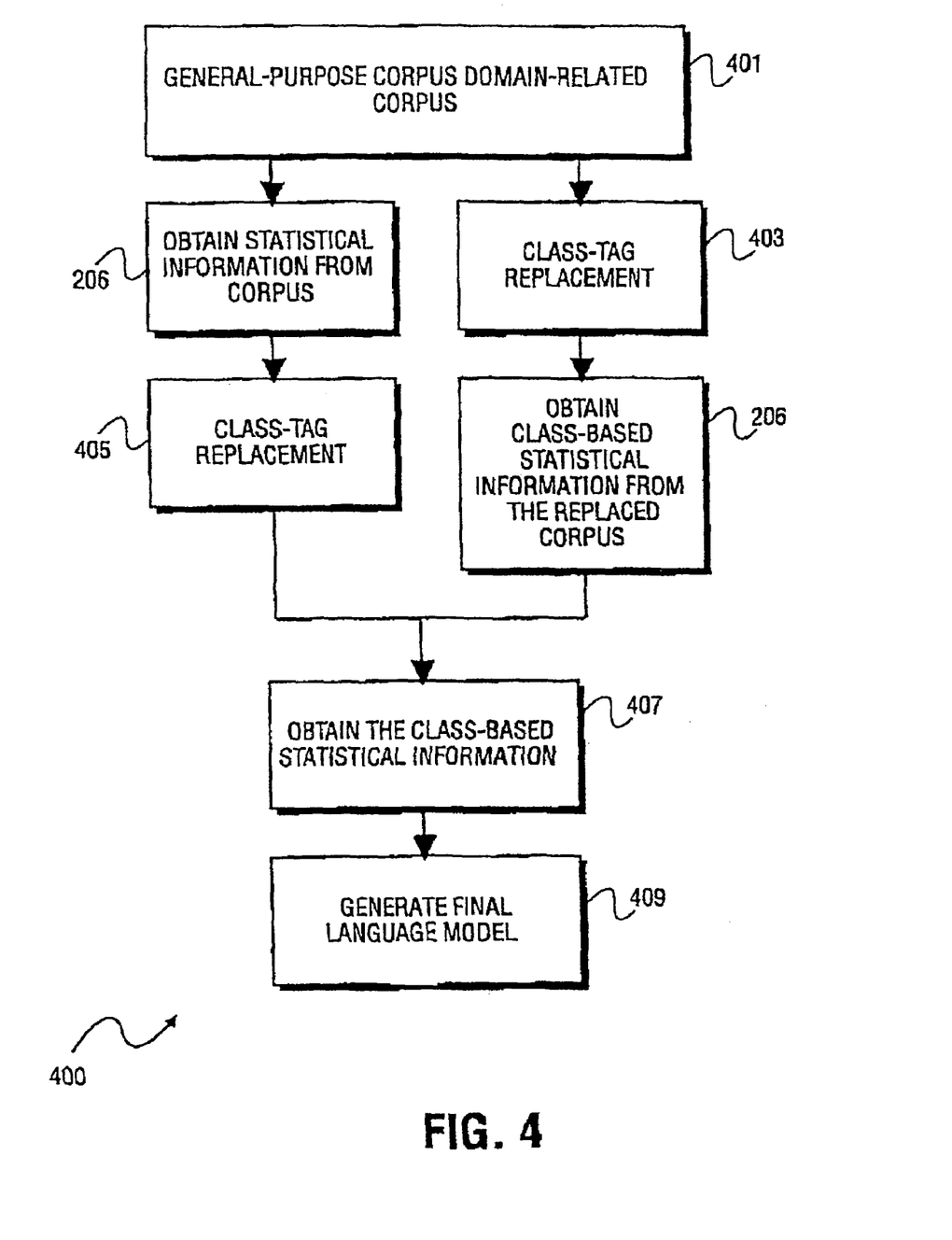
FIG. 4 is a flow chart of an operation to generate a class-based language model using class-based statistical representations according to one embodiment.

At operation block 204, the corpus is preprocessed. The corpus is obtained from real-world practice and therefore has no class-tag when obtained. The statistical representation obtained from the class-based RSLM has class-tags. The corpus is preprocessed to make it compatible with the class-based RSLM and used to smooth the class-based RSLM. FIG. 4 further describes detail aspects of preprocessing.

At operation block 206, a class-based statistical language model is built from the preprocessed corpus obtained in block 204. As described previously, the statistical language model uses a large amount of text of corpus to determine automatically the language model parameters. A class-based statistical representation of the class-based statistical language model is obtained. The statistical language model is further described in FIG. 4.

Figure 7:
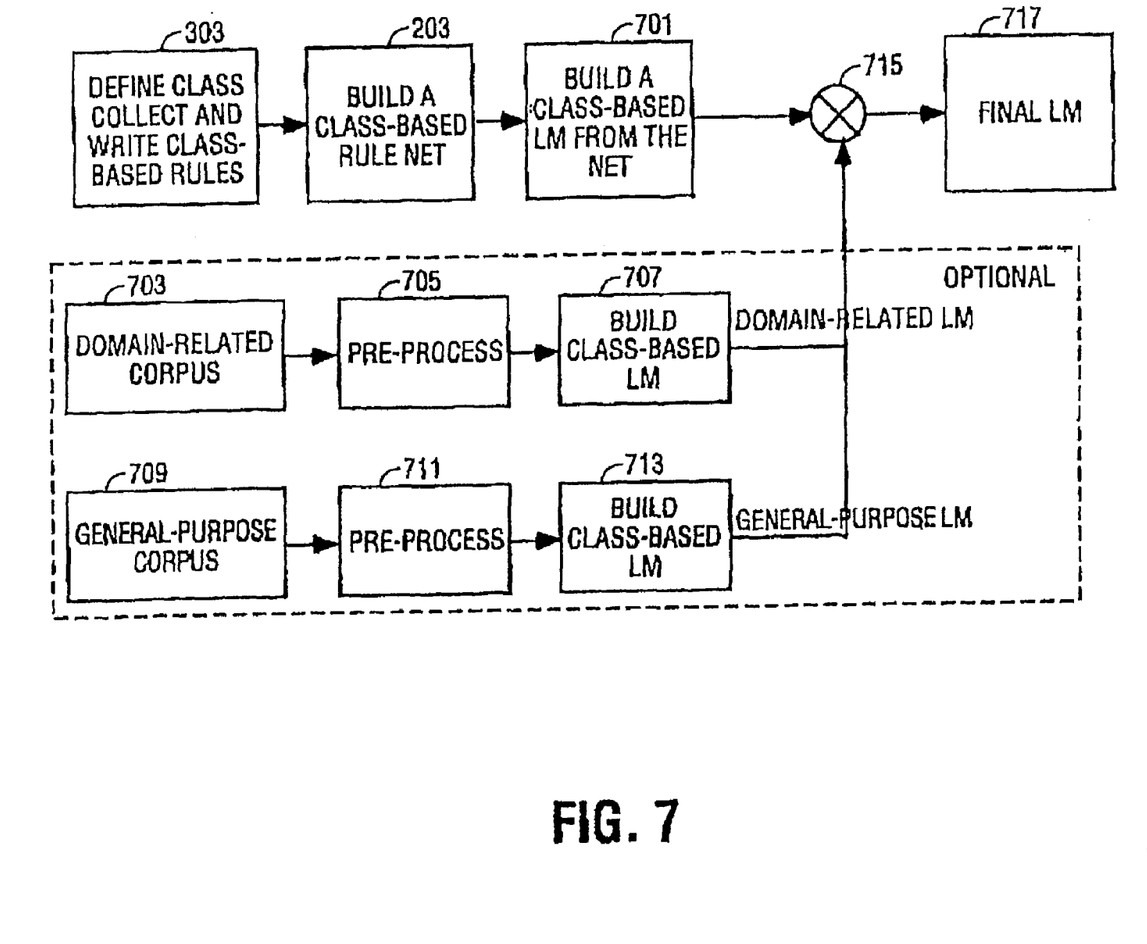
FIG. 7 is a functional flow diagram of applying smoothing/adapting to a generated class-based RSLM for use as a final class-based language model according to one embodiment.

At operation block 207, class-based statistical representations of the class-based rule-based and class-based statistical language models are combined. For example, a computer having a predefined algorithm may combine the class-based statistical representations using a predefined algorithm. The combination is often enhanced by smoothing/adapting the rule-based SLM with a general-purpose SLM or domain-related SLM. FIG. 7. further describes detail enhancing aspects using smoothing/adapting At operation block 208, a final language model is generated. The final language model is a result of combining the class-based statistical representation of class-based RSLM and class-based statistical language model.

FIG. 3 is a flow chart of an operation 300 to generate a final language model using a class-based rule net according to one embodiment. Operation 300 also allows generation of a final language model to be used in a speech processing system by defining a class and replacing words that belong to the class with class-tags to generate a class-based rule net and obtain a statistical representation.

Referring to FIG. 3, at operation block 301 domain related rules are obtained for use in generating a rule net. Domain related rules are handcrafted grammar rules. Preparation of domain related rules require obtaining as many domain related rules as possible. Alternatively, preparation of domain related rules require obtaining domain related rules as broad as possible. Numerous and broad domain related rules aid in providing enough knowledge for generation of a good performance rule net.

For example, domain related rules may be written using rule-based grammar which complies with Backus-Naur Form (BNF) which is a standard grammar form as follows:

$tagname=Zhiwei Lin|Jian Han|Yibao Zhao;
$attendee=$tagname [$attendee];
$room=room A|room B;
$rule1=I want to have a meeting with $attendee;
$rule2=I would like to meet with $attendee today;
$rule3=I would like to have a meeting in $room today;
$rule4=I want to have a meeting in $room.

In the above example, the symbol "|" indicates "or", the symbol "[x]" indicates that "x" can be omitted, and the symbol "$x" indicates that it is a variable. The above exemplary rules can be used to derive a large number of sentences. For example, using the above exemplary rules the following sentences can be derived:

I want to have a meeting with Zhiwei Lin.
I want to have a meeting with Zhiwei Lin, Jian Han.
I want to have a meeting with Yibao Zhao, zhiwei Lin.
I would like to meet with Jian Han, zhiwei Lin today.
I want to have a meeting in room A.
I would like to have a meeting in room B today.

At operation block 303, classes are defined manually. A class is a word set that contains words with the same or similar function. Classes are manually defined so that they can be carefully selected to ensure that words in a class have the same or similar function or semantic meaning. This careful selection aids in language understanding. For example, all person names can be considered as a class. Therefore, as discussed earlier in the above example, names such as Zhiwei Lin, Jian Han and Yibao Zhao can be considered as a class with a class-tag name "name", and room information such as room A, room B can be considered as a class with a class-tag name "room".

At operation block 305, words in each rule that belong to a defined class are replaced with their corresponding class-tags. For example, words can be replaced in the above example with class-tags as follows:

$tagname=<name>;
$attendee=$tagname [$attendee];
$tagname2=<room>;
$room=$tagname2 [$room];
$ww=want|I would like;
$rule1=I $ww to have a meeting with $attendee [today];
$rule2=I $ww to meet with $attendee [today];
$rule3=I $ww to have a meeting in $room [today];
$rule4=I $ww to have a meeting in $room.

where <name>={Zhiwei Lin, jian Han, Yibao Zhao}, <room>={room A, room B} are class-tags, "[x]" means "x" can be omitted, "$x" means it is a variable.

Figure 5:
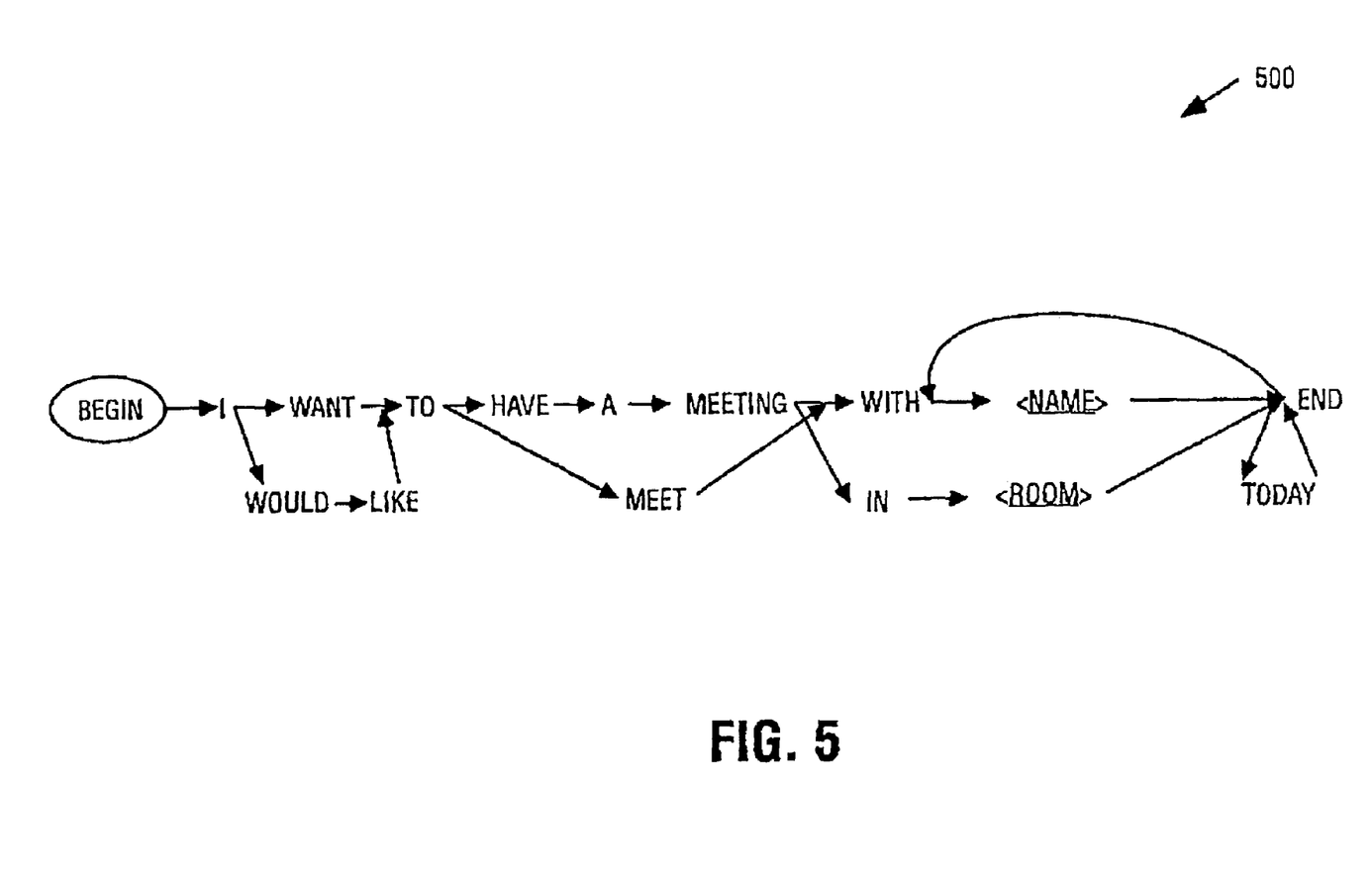
FIG. 5 is an illustration of a rule net and possible paths for the rule net according to one embodiment.

At operation block 203, a class-based rule net is generated using the domain-related rules with words replaced by class-tags. An exemplary rule net is shown in FIG. 5 in which each path from a beginning to an end expresses a valid sentence.

At operation block 205, statistical information is obtained. As described previously, the statistical information is obtained from the rule net with class-tags. The obtained statistical information is used for generating a final language model. Smoothing/adapting may be applied before using the language model as a final language model.

FIG. 4 is a flow chart of an operation 400 to generate a class-based language model using class-based statistical representations according to one embodiment. Operation 400 also describes methods to build a class-based SLM from a general-purpose or domain-related corpus.

Referring to FIG. 4, at operation block 401, general-purpose or domain-related corpus is obtained. The class-based SLM obtained from a RLM is often not robust. A general-purpose or domain-related corpus can be used to smooth the RLM-based SLM.

At operation block 403, words are replaced with their corresponding class-tags and applied to the general-purpose or domain-related corpus. Since the corpus is obtained from real-world application, it does not contain class-tags when obtained. Therefore, the corpus is preprocessed to make it compatible with the class-based RSLM. Preprocessing consists of replacing the words of the corpus with their corresponding class-tags. The replacement is performed on each word of the corpus. The replacement is applied according to the following three rules:

Rule 1. If a word has steady function and meaning in different context (it often appears in only one class). Then the word can be replaced directly with it's corresponding class-tag; for example, a person name always has the same function, expresses the same meaning even in a different context, so all the person names in the corpus can be replaced with person name's class-tag.

Rule 2. If a word shows different function and expresses different meaning in different contexts (it often appears in more than one class). Then the word should be replaced according to its context. This is performed by comparing the word's context, if the context is same, the word should be replaced with the corresponding class-tag. For example, a word "one" in a corpus may belong to <hour> class or a <minute> class. If the word's context in the corpus is "one hour", and there exists a class for "<hour> hour", then the word should be replaced with class-tag <hour>. If the word's context in corpus is "one minute", and there exists a class for "<minute> minute", then the word should be replaced with class-tag <minute>.

Rule 3. If Rule 1 and Rule 2 are not satisfied then the word shall not be replaced with a class-tag.

At operation block 405, class-tag replacement is applied to the statistical information obtained in operation block 206. Alternatively, class-tag replacement is applied directly to the corpus as described previously in operation block 403.

At operation block 407, class-based statistical information is obtained. The class-based statistical information is used to build a class-based statistical language model.

At operation block 409, as previously discussed previously, a final class-based statistical language model is generated using the class-based statistical information.

FIG. 6 is a flow chart of an operation 600 to generate a final language model using a statistical process to obtain class-based statistical representations according to one embodiment. Operation 600 also allows generation of a final language model by training a class-based statistical language model directly from a class-based rule net that is generated using domain related rules.

Figure 8:
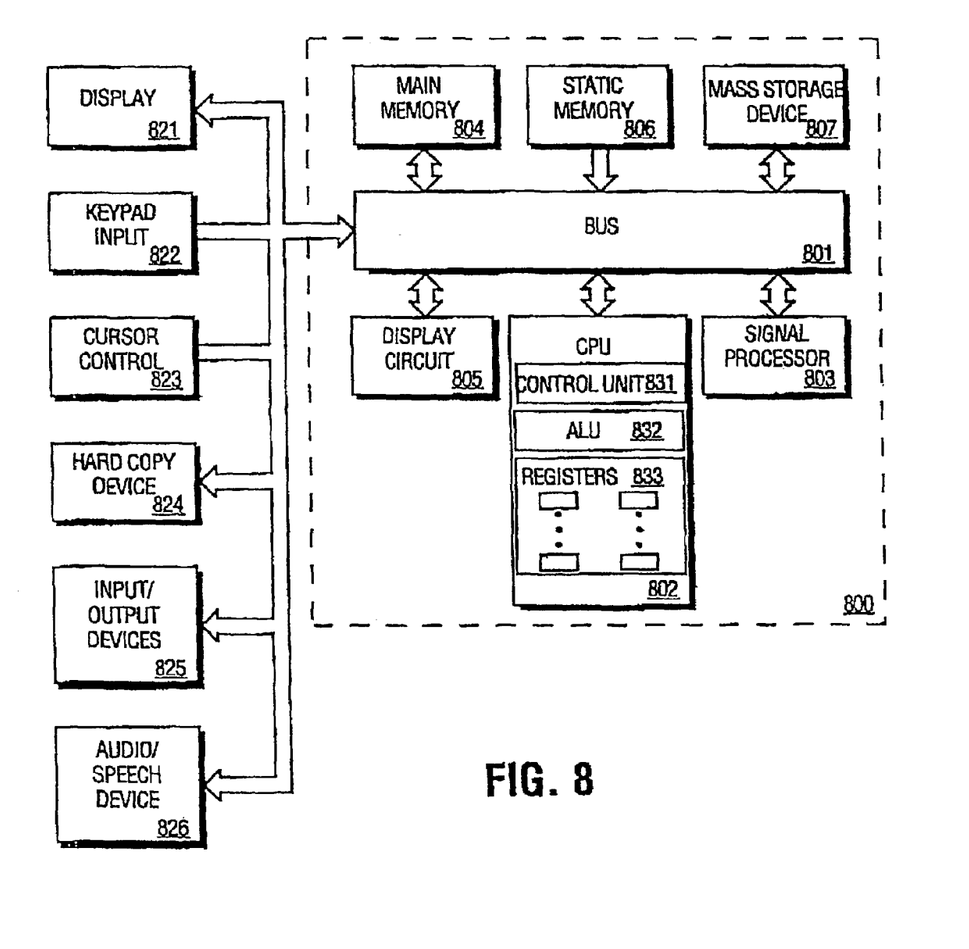
FIG. 8 an exemplary digital processing system for practicing one embodiment.

Referring to FIG. 6, at operation block 603, a statistical process is applied to the class-based rule net for obtaining class-based statistical representation. The statistical process may be performed by using a computer (e.g., digital processing system 800) using an algorithm that describes the training process. The statistical process is to go through each path of a class-based rule net from a beginning word to an ending word. FIG. 5 shows an exemplary rule net in which the arrows point to all the possible paths that can be taken. The statistical process goes through each possible path and obtains a statistical representation.

At operation block 605, a calculation is performed. The calculation consists of counting the frequency of each word sequence in the rule net. A class-tag is regarded as a word in the rule net. Therefore, a word sequence could either a word or a class-tag. An algorithm is executed as part of the statistical process to review all the word sequences in the rule net and follows each path in the rule net for counting the frequency of each word sequence in a path. The word sequences at same position in the rule net are counted only once although they may appear in more than one path.

The counting process is performed by using a formula (1) shown below. An algorithm executes the formula (1) to follow each path in the class-based rule net and count the same part in the rule net only once. In operation, the frequency of the word sequence is dictated by the following formula (1).

$$C(w_i, w_{i+1}, \ldots, w_{i+N-1}) = \sum_{\substack{w_l = w_{j_{l-i+1}}, l=i \ldots i+N-1 \\ (w_{j_1}, w_{j_2}, \ldots, w_{j_N}) \in PNet}} (w_{j_1}, w_{j_2}, \ldots, w_{j_N}) \quad (1)$$

In the above formula, "Pnet" is the N-words-length valid part path set of the net. An "N" is the history length in Ngram, and $j_l$ is the index of each word in the net. For example, when applying formula (1) to the rule net, the following can be obtained:

C(I, want)=1

C(want, to)=1

. . .

C(with, <NAME>)=1

. . .

Where C(with, <NAME>)=1 although the word pair (with, <NAME>) appears in more than six possible paths in the rule net but it is counted only once. The statistical information obtained by applying the frequency counting formula is used for generating a final language model.

At operation block 607, the class-based statistical information is obtained by applying the counting process from operational block 605. The class-based statistical information is used to generate a class-based statistical language model.

FIG. 7 is a functional flow diagram 700 of applying smoothing/adapting to a generated class-based RSLM for use as a final language model according to one embodiment. Operation 700 also allows smoothing/adapting to be applied to a class-based RSLM before using the language model as a final language model. Operation blocks in FIGS. 3,4 and 6 as discussed previously are used in the smoothing operation.

Referring to FIG. 7, at operation block 701, a class-based RSLM is generated using operation blocks in FIGS. 3 and 6. The language model is similar to the final language model discussed earlier FIGS. 3 and 6, however further enhancing operations are performed on the language model before its use as a final language model. Further enhancing functions such as smoothing/adapting, discussed below, aid in obtaining a high quality performance language model.

At operation block 703, domain-related corpus is obtained for smoothing/adapting the class-based RSLM. Domain-related corpus is a set of domain specific data.

At operation block 705, domain-related corpus is preprocessed. The domain-related corpus is preprocessed by replacing the words in the corpus with class-tags. As described previously, a statistical process is applied to the replaced corpus to obtain class-based statistical information. Alternatively, the domain-related corpus is preprocessed by applying the statistical process to the corpus and replacing the words in the statistical information with class-tags.

At operation block 707, a class-based statistical language model is built using the class-based statistical information. The statistical language model is used to smooth/adapt the class-based RSLM.

At operation block 709, general-purpose corpus is obtained for smoothing/adapting the class-based RSLM. General-purpose corpus is real-world data set collected from real-world applications. For example, text from a newspaper, is considered as a real-world corpus.

At operation block 711, the general-purpose corpus is preprocessed. As described previously preprocessing consists of replacing words in the general-purpose corpus with corresponding class-tags. Preprocessing is performed to make the general-purpose corpus compatible with class-based language model.

At operation block 713, a class-based statistical language model is built using the class-based statistical information. The statistical language model is used to smooth/adapt the class-based RSLM.

At operation block 715, domain-related language model from operation 707 is used in smoothing/adapting the class-based language model from operation 701. Smoothing/adapting with the domain-related language model helps the class-based RSLM to be used effectively in recognizing domain specific speech. Alternatively, a general-purpose language model from operation 713 can also be used to smooth/adapt the class-based language model from operation 701. The real-world corpus used in the general-purpose language model allows the class-based language model to be used effectively in recognizing a variety of speeches that is real-world. Smoothing/adapting the class-based RSLM with the general-purpose SLM also helps cure language indescribable scenario and obtain a robust system performance.

The class-based RSLM is generated from the rules hand-crafted manually, and contains only domain related knowledge. Domain-related knowledge does not cover all of the real-world language phenomena in the domain. Therefore a statistical language model generated from a large amount of text corpus containing rich language phenomena is obtained and applied. The statistical language model covers user-spoken sentences in stochastic manner and aids in covering real-world language.

The general-purpose SLM from operation 707 and/or domain-related SLM from operation 713 are applied separately to the class-based RSLM to create a final language model. Alternatively, both general-purpose SLM from operation 707 and domain-related SLM from operation 713 are applied simultaneously to the generated language model to create a final language model.

Smoothing/adapting enhances the system capability of recognizing voice. Smoothing/adapting is applied by interpolating the parameters of a system with those of a general-purpose statistical language model.

At operation 717, a final language model is generated. The final language model consists of the class-based language model that has been applied with smoothing/adapting.

FIG. 8 is an exemplary digital processing system 800 in which the present invention can be practiced. The speech processing and speech recognition techniques described herein can be implemented and utilized within digital processing system 800, which can represent a general purpose computer, portable computer, hand-held electronic device, or other like device. The components of digital processing system 800 are exemplary in which one or more components can be omitted or added. For example, one or more memory devices can be utilized for digital processing system 800.

Referring to FIG. 8, digital processing system 800 includes a central processing unit 802 and a signal processor 803 coupled to a display circuit 805, main memory 804, static memory 806, and mass storage device 807 via bus 801. Digital processing system 800 can also be coupled to a display 821, keypad input 822, cursor control 823, hard copy device 824, input/output (I/O) devices 825, and audio/speech device 826 via bus 801.

Bus 801 is a standard system bus for communicating information and signals. CPU 802 and signal processor 803 are processing units for digital processing system 800. CPU 802 or signal processor 803 or both can be used to process information and/or signals for digital processing system 800. Signal processor 803 can be used to process speech or audio information and signals for speech processing and recognition. Alternatively, CPU 802 can be used to process speech or audio information and signals for speech processing or recognition. CPU 802 includes a control unit 831, an arithmetic logic unit (ALU) 832, and several registers 833, which are used to process information and signals. Signal processor 803 can also include similar components as CPU 802.

Main memory 804 can be, e.g., a random access memory (RAM) or some other dynamic storage device, for storing information or instructions (program code), which are used by CPU 802 or signal processor 803. For example, main memory 804 may store speech or audio information and instructions to be executed by signal processor 803 to process the speech or audio information. Main memory 804 may also store temporary variables or other intermediate information during execution of instructions by CPU 802 or signal processor 803. Static memory 806, can be, e.g., a read only memory (ROM) and/or other static storage devices, for storing information or instructions, which can also be used by CPU 802 or signal processor 803. Mass storage device 807 can be, e.g., a hard or floppy disk drive or optical disk drive, for storing information or instructions for digital processing system 800.

Display 821 can be, e.g., a cathode ray tube (CRT) or liquid crystal display (LCD). Display device 821 displays information or graphics to a user. Digital processing system 801 can interface with display 821 via display circuit 805. Keypad input 822 is a alphanumeric input device for communicating information and command selections to digital processing system 800. Cursor control 823 can be, e.g., a mouse, a trackball, or cursor direction keys, for controlling movement of an object on display 821. Hard copy device 824 can be, e.g., a laser printer, for printing information on paper, film, or some other like medium. A number of input/output devices 825 can be coupled to digital processing system 800. For example, a speaker can be coupled to digital processing system 800. Audio/speech device 826 can be, e.g., a microphone with an analog to digital converter, for capturing sounds of speech in an analog form and transforming the sounds into digital form, which can be used by signal processor 803 and/or CPU 802, for speech processing or recognition.

The speech processing techniques described herein can be implemented by executing code or instructions stored in a machine-readable medium coupled with or contained in digital processing system 800. For example, CPU 802 or signal processor 203 can execute the code or instructions stored in main memory 804 to process speech or to recognize continuous speech. The machine-readable medium can include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Figure 9:
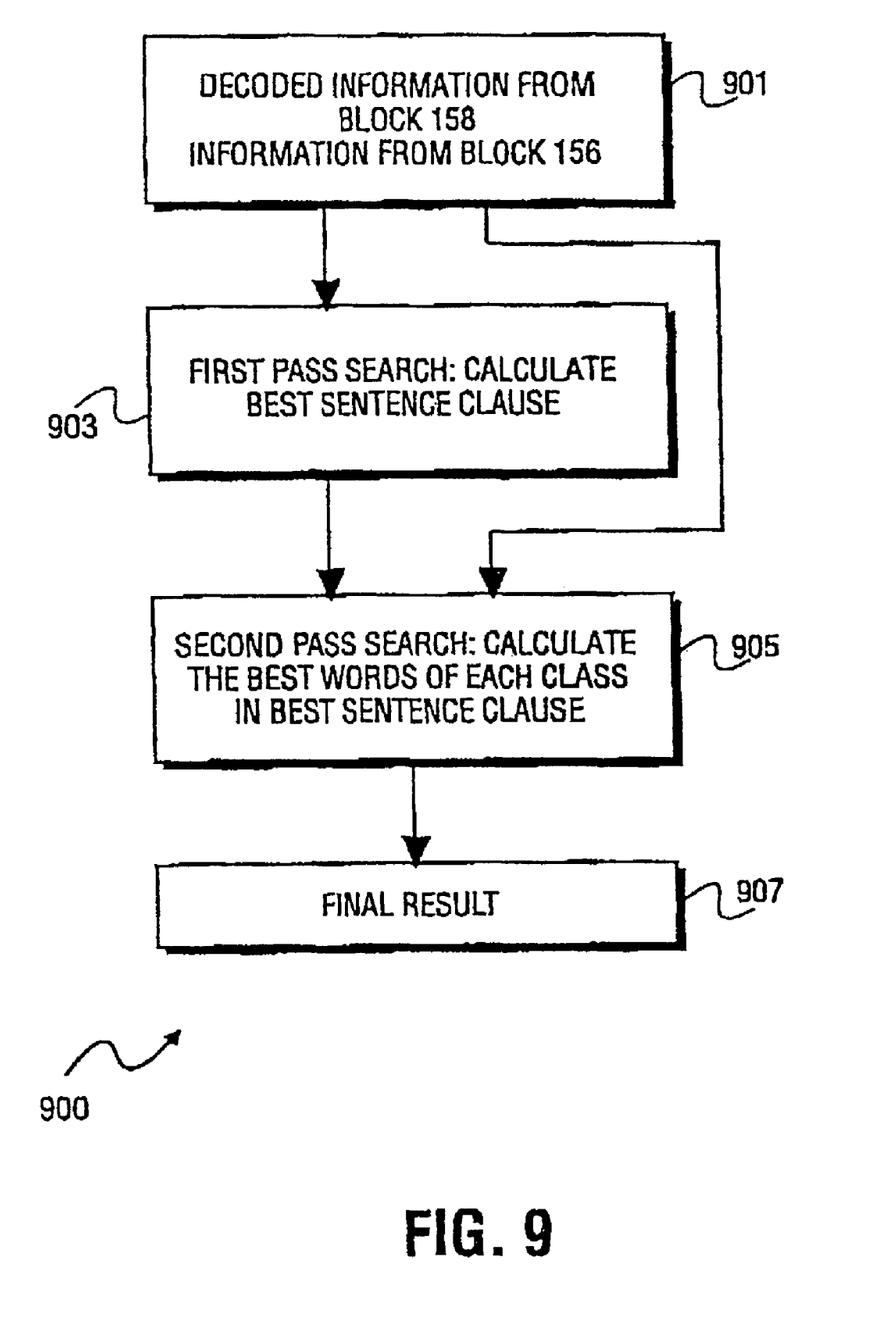
FIG. 9 is a functional flow diagram of applying a two-pass search method to obtain a final result according to one embodiment.

FIG. 9 is a functional flow diagram 900 of applying a two-pass search method to obtain a final result according to one embodiment. The two pass search method is applied to information decoded from the acoustic model 158, and information sent by feature extractor 156. Operation 900 also applies a first pass search method to obtain a sentence clause and a second pass search method to the sentence clause obtained in the first pass search to obtain a final result.

At operation block 901, the decoded information and information from feature extractor 156 is obtained. Decoded information is information sent from acoustic model 158. The obtained decoded information and information from feature extractor 156 is used as input for the two pass search method.

At operation block 903, a first pass search method is applied. A formula is used in applying the first pass search method to the decoded information. The first pass search method determines all the sentence clauses that succeed from all possible sentences in the language model. The first pass search matches the all the information obtained with best-matched sentence clauses and obtains a sentence clause. The first pass search applies a formula for determining the match. The formula applied is as follows:

$$Pr(S) = \Pi Pr(C_{i-N+1}, \ldots, C_{i-1})$$

Where Pr(S) is the probability of sentence clause S and C expresses class-tag, Ci is the ith class-tag in the sentence clause.

At operation 905, a second pass search method is applied for obtaining a final result. The second pass search is applied to the sentence clauses obtained in the first pass search method. Second pass search is also applied on the decoded information and information from feature extractor 156 simultaneously. Second pass search method matches all the information obtained with the words of each class in the sentence clause obtained in the first pass search, and finds the best-matched word for each class. The second pass search applies a formula for determining the match. The formula applied is as follows:

$$Pr(S) = \Pi_j Pr(W_j \mid C_i)$$

Where Wj is the jth word in the ith class_of the sentence clause.

At operation 907, the final result is obtained. The result is a text sentence that matches speech obtained by the user 152 accurately using the statistical language model.

Thus, a method and system for providing a statistical representation from rule-based grammar specifications have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A speech processing method comprising:
   manually defining a set of classes for words/phrases, each class being associated with a class-tag;
   replacing words of domain-related rules with corresponding class-tags to generate class-based domain-related rules;

generating a class-based rule net using the class-based domain-related rules;
obtaining a class-based statistical representation from the class-based rule net; and
combining the class-based statistical representation with a class-based statistical representation from a statistical language model to generate a final language model.

2. The speech processing method of claim 1, wherein replacing words comprising:
selecting words with same function and semantic meaning;
associating each of the words with one of the set of classes; and
replacing each of the words with a class-tag of class that is associated with the word in the domain-related rules.

3. The speech processing method of claim 1, further comprising applying a two-pass search method for decoding speech the final language model.

4. The speech processing method of claim 3, wherein the two-pass search method comprises:
obtaining a sentence clause from a rule net using a first pass search process; and
obtaining a final result from obtained sentence clause using a second pass search process.

5. The speech processing method of claim 4, wherein the first pass search process further includes:
determining if a word belongs to a predefined class;
associating the determined word with the predefined class; and
creating a new class for the word that does not belong to a predefined class.

6. The speech processing method of claim 1, wherein combining the class-based statistical representations comprises:
using a domain-related and/or general-purpose corpus;
preprocessing the domain-related and/or general-purpose corpus to replace words in the domain-related and/or general-purpose corpus with corresponding class-tags to generate a class-based corpus;
obtaining a class-based statistical representation from the class-based corpus; and
merging the class-based statistical representation from the class-based corpus with the class-based statistical representation from the class-based rule net to generate the final language model.

7. The speech processing method of claim 1, further comprising applying smoothing/adapting to the final language model before using as a final language model.

8. A system comprising:
a memory to store a statistical language model representation of a class-tag based rule net; and
a processor to enable a user to manually define a set of classes for words/phrases, each class being associated with a class-tag, to replace words of domain-related rules with corresponding class-tags to generate class-based domain-related rules, to generate a class-based rule net using the class-based domain-related rules, to obtain a class-based statistical representation from the class-based rule net, and to combine the class-based statistical representation with a class-based statistical representation from a statistical language model to generate a final language model.

9. The system of claim 8, wherein the processor replaces the words with class-tags by selecting words with same function and semantic meaning, associating each of the words with one of the set of classes, and replacing each of the words with a class-tag of class that is associated with the word in the domain-related rules.

10. The system of claim 8, wherein the processor further applies a two-pass search method for decoding speech the final language model.

11. The system of claim 10, wherein the two-pass search method comprises obtaining a sentence clause from a rule net using a first pass search method, and obtaining a final result from obtained sentence clause using a second pass search method.

12. The system of claim 11, wherein the processor is to apply the first pass search process by determining if a word belongs to a predefined class, to associate the determined word with the predefined class, and to create a new class for the word that does not belong to a predefined class.

13. The system of claim 8, wherein the processor combines the class-based statistical representations by:
using a domain-related and/or general-purpose corpus;
preprocessing the domain-related and/or general-purpose corpus to replace words in the domain-related and/or general-purpose corpus with corresponding class-tags to generate a class-based corpus; and
obtaining a class-based statistical representation from the class-based corpus; and
merging the class-based statistical representation from the class-based corpus with the class-based statistical representation from the class-based rule net to generate the final language model.

14. The system of claim 8, wherein the processor is to apply smoothing/adapting to the final language model before using as a final language model.

15. A machine readable storage medium having stored therein a plurality of machine executable instructions, wherein when executed, the instructions perform operations comprising:
manually defining a set of classes for words/phrases, each class being associated with a class-tag;
replacing words of domain-related rules with corresponding class-tags to generate class-based domain-related rules;
generating a class-based rule net using the class-based domain-related rules;
obtaining a class-based statistical representation from the class-based rule net; and
combining the class-based statistical representation with a class-based statistical representation from a statistical language model to generate a final language model.

16. The storage medium of claim 15, wherein replacing words further includes:
selecting words with same function and semantic meaning;
associating each of the words with one of the set of classes; and
replacing each of the words with a class-tag of class that is associated with the word in the domain-related rules.

17. The storage medium of claim 15, wherein the operations further comprise applying a two-pass search method for decoding speech with the final language model.

18. The storage medium of claim 17, wherein the two-pass search method comprises:
obtaining a sentence clause from a rule net using a first pass search process; and
obtaining a final result from obtained sentence clause using a second pass search method.

19. The storage medium of claim 18, wherein the first pass search process further includes:
   determining if a word belongs to a predefined class;
   associating the determined word with the predefined class; and
   creating a new class for a word that does not belong to a predefined class.

20. The storage medium of claim 15, wherein combining the class-based statistical representations comprises:
   using a domain-related and/or general-purpose corpus;
   preprocessing the domain-related and/or general-purpose corpus to replace words in the domain-related and/or general-purpose corpus with corresponding class-tags to generate a class-based corpus;
   obtaining a class-based statistical representation from the class-based corpus; and
   merging the class-based statistical representation from the class-based corpus with the class-based statistical representation from the class-based rule net to generate the final language model.

21. The storage medium of claim 15, wherein the operations further comprises applying smoothing/adapting to the final language model before using as a final language model.

* * * * *